(No Model.)

M. COWLES.
SAW SETTING AND SHARPENING DEVICE.

No. 280,138. Patented June 26, 1883.

Witnesses:
B. C. Fenwick
Robt. L. Fenwick

Inventor:
Milan Cowles
by his attys
Fenwick & Lawrence

UNITED STATES PATENT OFFICE.

MILAN COWLES, OF BRADFORD LAKE, ASSIGNOR OF ONE-HALF TO CHARLES L. FULLER, OF OTSEGO LAKE, MICHIGAN.

SAW SETTING AND SHARPENING DEVICE.

SPECIFICATION forming part of Letters Patent No. 280,138, dated June 26, 1883.

Application filed March 13, 1883. (No model.)

*To all whom it may concern:*

Be it known that I, MILAN COWLES, a citizen of the United States, residing at Bradford Lake, in the county of Otsego and State of Michigan, have invented a new and useful improvement in swage saw-sets and sharpeners for crosscut-saws, circular crosscut-saws, and drag-saws, of which the following is a specification.

My invention relates to improvements in setting and sharpening saw-teeth; and the objects of my invention are to uniformly set the teeth of all crosscut-saws, so as to enable them to cut a kerf of any desired width, and to sharpen and straighten the teeth when bent at their points. I attain these objects by the mechanism illustrated in the accompanying drawings, in which—

Figure 1:
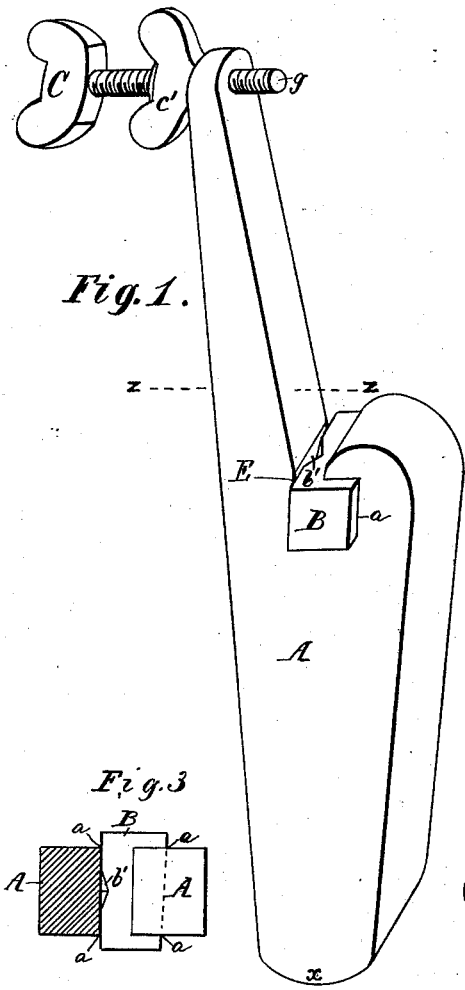
Figure 3:
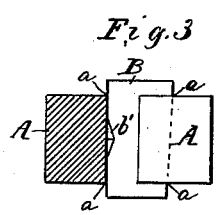
Figure 2:
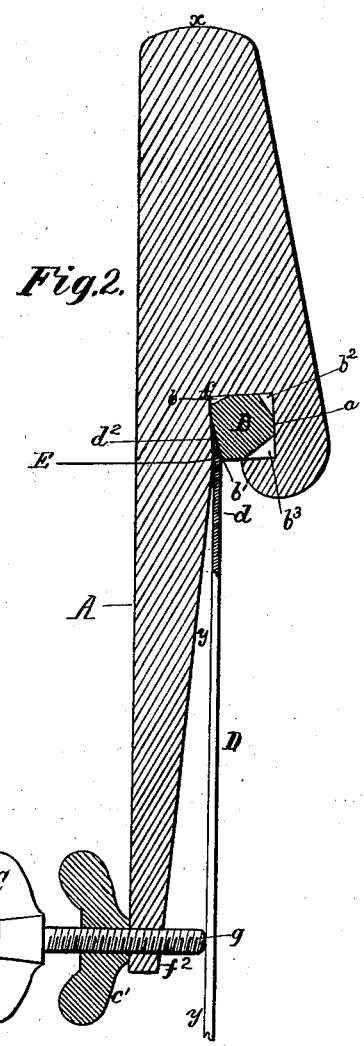
Figure 4:
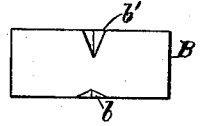
Figure 5:
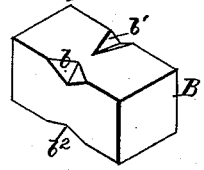

Figure 1 is an inverted view of the tool complete. Fig. 2 is a vertical longitudinal central section of the tool in position to perform its work upon a saw, D. Fig. 3 is a view on line $z\ z$ of Fig. 1, showing the wedge-shape formation of the seat of the "die-block" B, as well as the die-block itself, the latter being shown in working position, as indicated in Figs. 1 and 2. Fig. 4 is a view in elevation of one side of the die or block B, and Fig. 5 is a perspective view of the die B; and in these latter figures the die-block B is shown with parallel sides.

Similar letters refer to similar parts throughout the several views.

A is the main body of the tool.

B is a block or die, perfectly square in cross-section, but slightly wedge-shaped lengthwise, in order to retain itself in its seat when in working position, as in Fig. 1, and in which notches, as $b\ b'\ b^2\ b^3$, are cut on each side, as shown, to fit and in which to swage the various-shaped saw-teeth for which the tool is adapted for use. The die-block B is adapted to be inserted in the wedging-slot $a$ in the body of the tool A, as represented in Figs. 1, 2, and 3, the slot $a$ being made open at its ends and partly at its bottom, and wedging to correspond with the wedging shape of the die-block, and thus firmly hold the latter in working position during the act of use.

D indicates the blade of a saw to be operated upon; $d$, the body of one of its saw-teeth, and $d^2$ the point of the saw-tooth to be set. In Fig. 2 the point of the saw-tooth $d^2$ is shown inserted in the notch $b'$ of the die-block B, preparatory to sharpening and giving "set" to the point.

C is a thumb set-screw for adjusting the set, and $c'$ a jam-nut to keep the set-screw C from loosening while being used.

E is a slight shoulder in the slot $a$, as shown, over which the saw-teeth are bent.

The set in the point of the saw-tooth is accomplished by forcing the point $d^2$ of the tooth into the notch $b'$ in the die-block B, thus bending it over the shoulder E, and at the same time sharpening the edges of the tooth by means of the edges of the point of the tooth being forced against the sides of the notch in the body of the die-block, which act also straightens the point of the tooth if bent.

To use the tool and to accomplish the setting of the saw-teeth and sharpening and straightening the same, loosen the jam-nut $c'$, and adjust the thumb set-screw C so as to give the desired angle or set to the point of the tooth when the tooth is forced into the notch $b'$ of the die B. Then place the tool in vertical position, as shown in Fig. 2, with the point of the tooth inserted in the notch $b'$ and with the point $g$ of the set-screw C touching the side of the blade of the saw D. Then strike the head $x$ of the tool with a hammer, thus forcing and bending the point of the tooth over the shoulder E and swaging the edges of the tooth against the tapering sides of the notch $b'$, thereby sharpening the same.

It will be seen that the rear side of the slot $a$, on the line from $f$ to E, presents a plane surface above the shoulder E, (see Fig. 2,) which is divergent from that plane of the tool which is on the line from E to $f^2$; and that the act of forcing the tool down by a blow of the hammer will cause the saw-point $d^2$ to become forcibly seated against the rear side of said slot $a$, thus bending the saw-point over and upon the shoulder E, which last action will cause the point $g$ of the set-screw C to firmly bear against the saw-blade D, and so guide the tool A in its slight descent due to the blow of the hammer; and, further, that the nearer the end $f^2$ of the tool is set to the blade D by the set-screw C the greater will be the deflection of the line $f$ E or the rear of the slot $a$ from the vertical line $y\ y$ of the saw D, and hence the greater will be the set of the point of the tooth from the face-line $y\ y$ of the saw; and, further, that having once determined how great shall be the set of the saw-point to one side of the face of the saw, and having accordingly adjusted the set-screw C, all the teeth of the saw may be set exactly alike so long as the set-screw remains as adjusted. Of course it will be understood that the saw-blade D is firmly held in position as indicated, by any proper means, during the operation of setting and sharpening its teeth.

What I claim as my invention, and desire to secure by Letters Patent, is—

A swage saw-set and sharpener comprising a body portion, A, provided with the open die receiving and supporting slot $a$, having a shoulder, as E, the tapering adjustable die-block B, and set-screw C, substantially as and for the purpose described.

MILAN COWLES.

Witnesses:
A. J. TAYLOR,
GEO. W. SMITH.